United States Patent
Turner et al.

(10) Patent No.: US 10,363,834 B2
(45) Date of Patent: Jul. 30, 2019

(54) ELECTRIC VEHICLE WITH HIGH VOLTAGE MODULE HAVING HIGH AND LOW VOLTAGE SECTIONS HAVING A COMMON GROUND

(71) Applicants: Qian Turner, Clarkston, MI (US); Yuriy Taborisskiy, West Bloomfield, MI (US)

(72) Inventors: Qian Turner, Clarkston, MI (US); Yuriy Taborisskiy, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 129 days.

(21) Appl. No.: 15/400,444

(22) Filed: Jan. 6, 2017

(65) Prior Publication Data

US 2018/0198400 A1 Jul. 12, 2018

(51) Int. Cl.
*H02P 27/06* (2006.01)
*B60L 58/20* (2019.01)
*B60L 3/00* (2019.01)
*B61L 15/00* (2006.01)

(52) U.S. Cl.
CPC ............. *B60L 58/20* (2019.02); *B60L 3/0069* (2013.01); *B61L 15/0036* (2013.01); *H02P 27/06* (2013.01); *Y02T 10/642* (2013.01); *Y02T 10/7005* (2013.01)

(58) Field of Classification Search
CPC ...... B60W 20/00; B60W 10/08; B60W 10/26; B60W 10/06; B60L 11/18; H04B 10/25; H04B 10/40; H04B 10/50; H04B 10/80; H01M 2/06; H01M 2/12; H01M 2/10; H01M 2/30; G01R 31/36; G01R 31/00; G01R 31/007

USPC ........ 307/10.1, 10.2, 9.1, 43, 66, 64, 80, 82; 290/40 C; 398/104
See application file for complete search history.

(56) References Cited

U.S. PATENT DOCUMENTS

| | | | |
|---|---|---|---|
| 5,268,971 A | 12/1993 | Nilsson et al. | |
| 9,979,491 B2 * | 5/2018 | Greene | H04L 12/40 |
| 2006/0066109 A1 * | 3/2006 | Nasr | F02D 29/06 |
| | | | 290/40 C |

(Continued)

OTHER PUBLICATIONS

Ari, M. et al., International Journal on Technical and Physical Problems of Engineering, "Electrical Power Over Fiber Optics", Issue 5, vol. 2, No. 4, pp. 85-91 (Dec. 2010).

(Continued)

*Primary Examiner* — Fritz M Fleming
*Assistant Examiner* — Jagdeep S Dhillon
(74) *Attorney, Agent, or Firm* — Ralph E. Smith

(57) ABSTRACT

In accordance with an aspect of the present disclosure, a vehicle has an electric traction motor and a high voltage module having a low voltage section and a high voltage section. The low voltage section includes a power over fiber receive module and a first optical data module. A low voltage supply is electrically connected to a power over fiber transmit module. The power over fiber transmit module is optically coupled by a power over fiber cable to the power over fiber receive module of the low voltage section of the high voltage module. An electronic motor control unit includes a second optical data module that is optically coupled by an optical fiber data bus cable to the first optical data module of the low voltage section of the high voltage module.

3 Claims, 3 Drawing Sheets

(56) References Cited

U.S. PATENT DOCUMENTS

| | | | |
|---|---|---|---|
| 2009/0184760 A1 | 7/2009 | Hauenstein | |
| 2013/0077924 A1 | 3/2013 | Shin et al. | |
| 2014/0205294 A1 | 7/2014 | Finkelstein | |
| 2015/0307082 A1* | 10/2015 | Nallapa | B60L 58/12 701/22 |
| 2016/0018471 A1* | 1/2016 | Lee | G01R 31/367 702/63 |
| 2017/0272157 A1* | 9/2017 | Crowne | H04B 10/25 |
| 2018/0114955 A1* | 4/2018 | Robert | H01M 2/06 |
| 2018/0126993 A1* | 5/2018 | Newman | B60W 30/188 |

OTHER PUBLICATIONS

Laser Motive, "Comparison of Optical Fiber to Copper Wire", http://lasermotive.com/wp-content/uploads/2012/12/Fiber_vs_Copper_summary2013Jan.pdf.

Lumentum, "Power over Fiber", https://www.lumentum.com/sites/default/files/technical-library-items/poweroverfiber-tn-pv-ae_0.pdf (2015).

Oliviero, Andrew, "Cabling: The Complete Guide to Copper and Fiber-Optic Networking", Fourth Edition, (2009).

Wikipedia, "Power-over-fiber", https://en.wikipedia.org/w/index.php?title=Power-over-fiber&oldid=683163014 (2015).

\* cited by examiner

ELECTRIC VEHICLE WITH HIGH VOLTAGE MODULE HAVING HIGH AND LOW VOLTAGE SECTIONS HAVING A COMMON GROUND

The present invention relates to automotive vehicles having an electric powertrain with a high voltage module having a common ground for high voltage and low voltage.

BACKGROUND

As used herein, "electric vehicle" means an automotive vehicle having an electric powertrain and includes what is commonly known as a battery electric vehicle having only the electric powertrain and a hybrid electric vehicle having an electric powertrain and convention internal combustion engine powertrain.

FIG. 1 is a simplified diagram of a prior art electric vehicle 100 having a high voltage module 102. High voltage module 102 is powered by two direct current supplies, a high voltage direct current supply 104 and a low voltage direct current supply 106 and is electrically connected to them in conventional fashion with electrical conductors such as copper wire. High voltage supply 104 is for example a 350 volts direct current battery pack 108. Direct current is sometimes referred to herein as DC, volts direct current is sometimes referred to herein as VDC, alternating current is sometimes referred to herein as AC and volts alternating current is sometimes referred to herein as VAC. Low voltage supply 106 includes for example a conventional 12 VDC battery 110 of the type used for automotive vehicles. In a hybrid electric vehicle, low voltage supply 106 typically also includes an alternator.

High voltage module 102 has a low voltage section 112, a high voltage section 114 and isolation barrier electrically isolating low voltage section 112 from high voltage section 114. Isolation barrier 116 includes, for example, one or more isolating DC/DC converters 117 that provide low voltage DC from low voltage supply 106 to high voltage section 114 that is isolated from the low voltage DC from low voltage supply 106. This low voltage DC provides low voltage DC power such as to power logic devices of high voltage section 114 that require low voltage DC. This low voltage DC provided to high voltage section 114 in an example includes 12 VDC and 5 VDC. The low voltage DC from low voltage supply 106 on the low voltage side of isolation barrier 116 is electrically connected to electronic devices in low voltage section 112 representatively shown by PCB 113. The low voltage DC on the high voltage side of isolation barrier 116, for example, the output(s) of the DC/DC converter(s) 117, is electrically connected to electronic devices in high voltage section 114 representatively shown by PCB 115.

Motor 118 is electrically coupled to high voltage section 114. Motor 118 is illustratively an AC motor and high voltage section 114 includes an inverter (not shown) that inverts the high voltage DC from high voltage supply 104 to AC that is output to motor 118. The inverter includes power switching semiconductors that are controlled by one or more control logic devices of low voltage section 112, shown representatively by PCB 113. Low voltage section 112 (e.g. the control logic devices) is powered by low voltage, such as 12 VDC from low voltage supply 106 as is an electronic motor control unit referred to herein as EMCU 120. Low voltage section 112 is thus considered a low voltage section. EMCU 120 is logically coupled to low voltage section 112 of motor power module 102, such as by data bus 122, a controller area network bus for example. Controller area network is referred to herein as "CAN" and a controller area bus is referred to herein as a CAN bus.

While low voltage supply 106 supplies the low voltage power for the electronic devices of high voltage section 114 that are powered by low voltage, the low voltage supply 106 and low voltage power of high voltage section 114 do not have common grounds. This is done for safety purposes, but presents complications in the design of the interface between the low voltage section 112 and the high voltage section 114 since high voltage module 102 must then have two separate grounds, one for low voltage section 112 and one for high voltage section 114. To transfer data, control signals, etc., between low voltage section 112 and high voltage section 114, isolation barrier 116 is required to provide the requisite electrical isolation between low voltage section 112 and high voltage section to electrically isolate low voltage section 112 from the high voltage supply 104, and thus also electrically isolate the low voltage power and other components of the vehicle 100 electrically connected to the low voltage power, such as EMCU 120, from the high voltage section 114. Further, vehicle 100 must have both high voltage cabling to transfer the high voltage power, such as from high voltage supply 104 to high voltage section 114 and from high voltage section 114 to motor 118 and also low voltage cabling to transfer the low voltage power, such as from low voltage supply 106 to low voltage section 112 and EMCU 120. In this regard, the low voltage cabling includes electrical conductors such as copper wire that electrically connect the low voltage supply 106 to low voltage section 112, such as a positive electrical conductor and a ground electrical conductor. The high voltage cabling includes electrical cables having electrical conductors that electrically connect the high voltage supply 104 to high voltage section 114.

SUMMARY

In accordance with an aspect of the present disclosure, a vehicle has an electric traction motor and a high voltage module having a low voltage section and a high voltage section. The high voltage section is electrically connected to the electric traction motor and provides electric power to the electric traction motor. The high voltage section is also electrically connected to a high voltage direct current supply. The low voltage section includes a power over fiber receive module and a first optical data module. A low voltage direct current supply is electrically connected to a power over fiber transmit module. The power over fiber transmit module is optically coupled by a power over fiber cable to the power over fiber receive module of the low voltage section of the high voltage module. An electronic motor control unit is powered by the low voltage direct current supply and electrically connected to the low voltage direct current supply. The electronic motor control unit includes a second optical data module that is optically coupled by an optical fiber data bus cable to the first optical data module of the low voltage section of the high voltage module.

In accordance with an aspect of the present disclosure, the high voltage module is interconnected with any low voltage section of the vehicle only by optical fibers.

In accordance with an aspect of the present disclosure, positive and negative high voltage cables electrically connect the high voltage section of the high voltage module to the high voltage direct current supply. A cable includes the positive and negative high voltage cables, the power over fiber cable and the optical fiber data bus cable with optical fibers of the power over fiber cable and the optical fiber data bus cable surrounding the positive and negative high voltage cables.

BRIEF DESCRIPTION OF THE DRAWINGS

The present invention will become more fully understood from the detailed description and the accompanying drawings, wherein.

DETAILED DESCRIPTION

Figure 1:
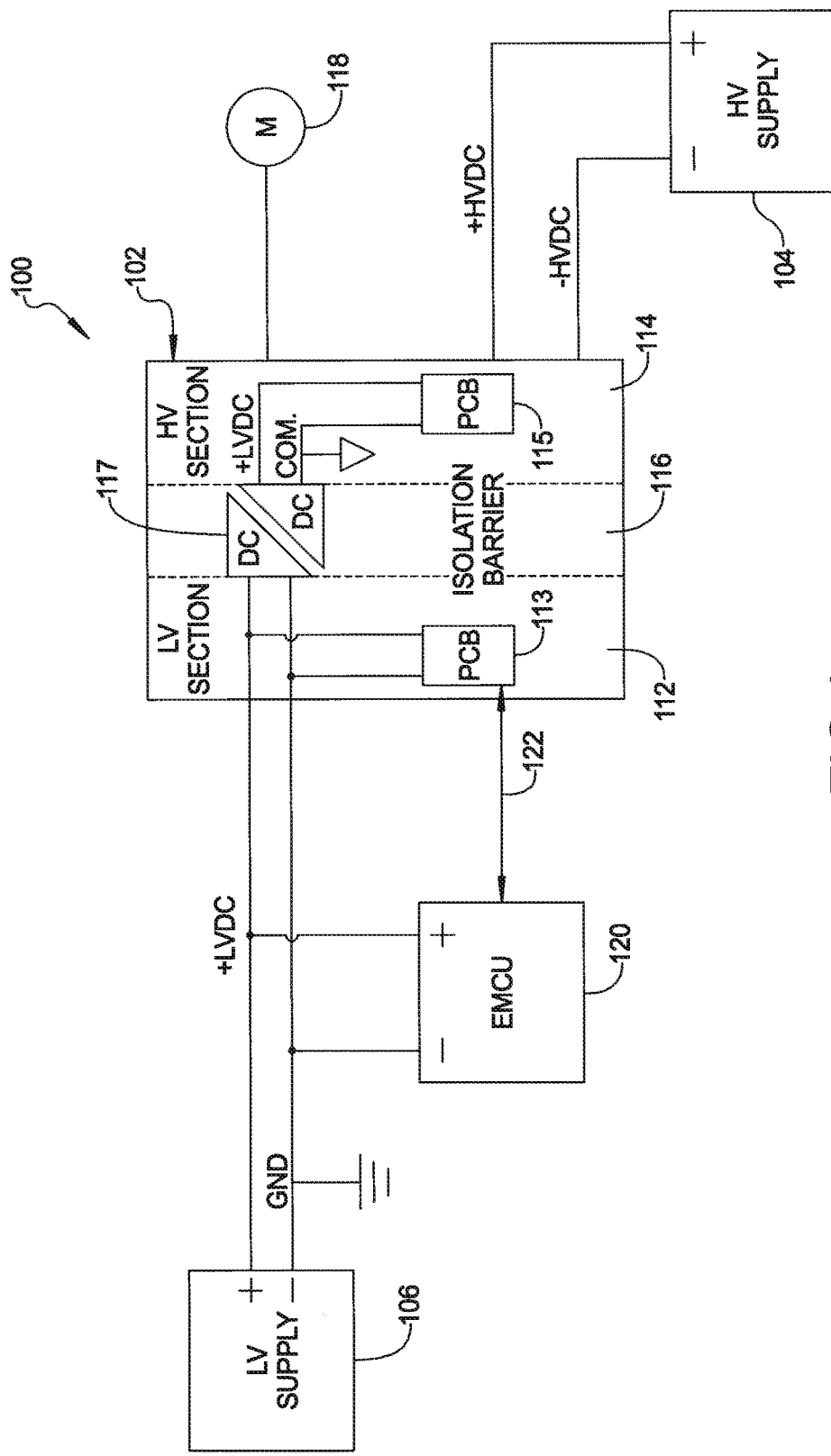
FIG. 1 is a simplified diagram of a power system of an electric vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

Figure 2:
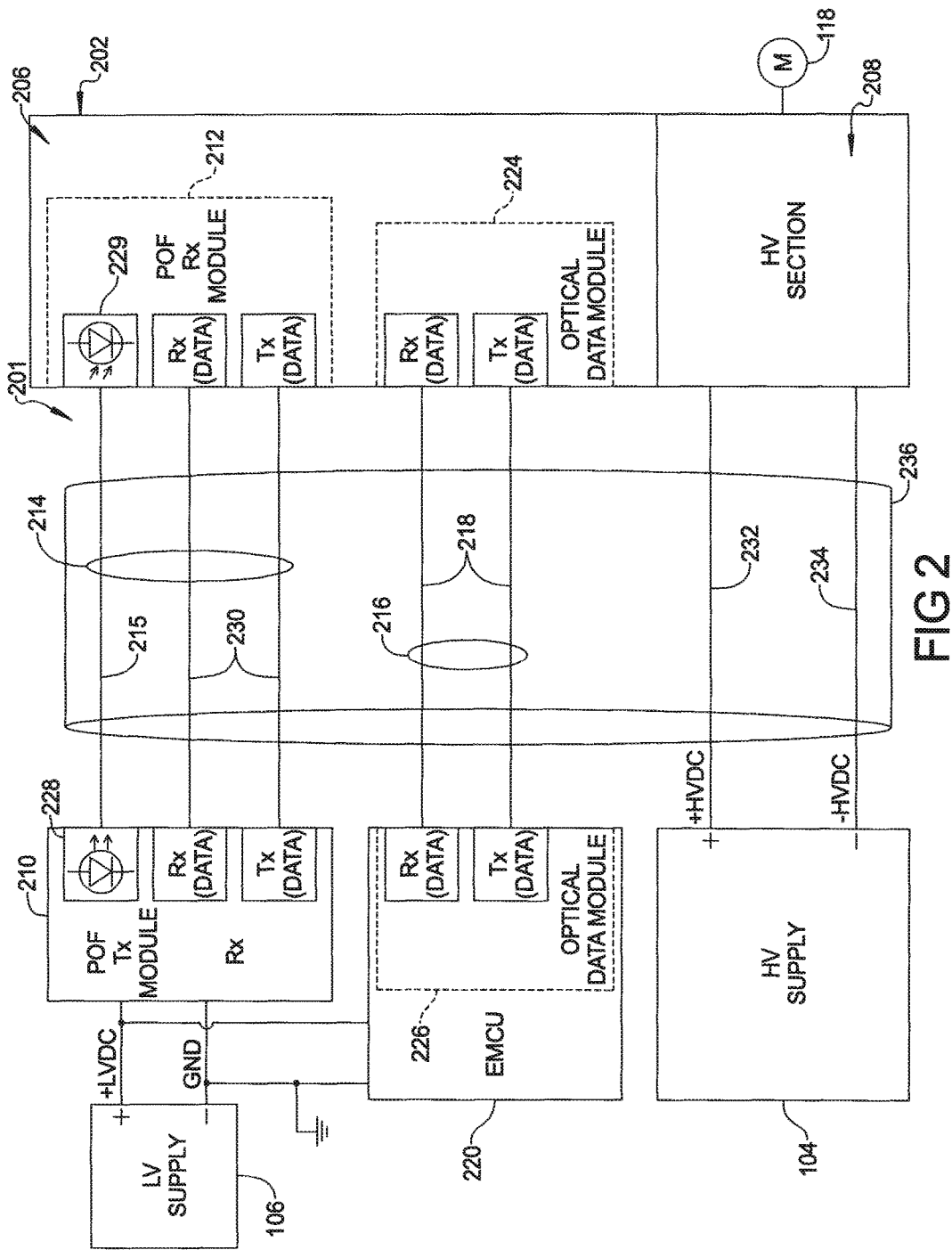
FIG. 2 is a simplified diagram of a power system of an electric vehicle in accordance with an aspect of the present disclosure.

FIG. 2 is a simplified diagram of an electric vehicle 200 having an electrical power system 201 in accordance with an aspect of the present disclosure. Electrical power system 201 includes high voltage module 202, high voltage supply 104 and low voltage supply 106. High voltage module 202 also uses the two voltage sources—high voltage supply 104 and low voltage supply 106. However, the power connection between low voltage supply 106 and high voltage module 202 is by power over fiber, as discussed in more detail below. High voltage module 202 includes a low voltage section 206 and a high voltage section 208.

Motor 118 is electrically coupled to high voltage section 208. Motor 118 is illustratively an AC motor as discussed above and high voltage section 208 includes an inverter (not shown) that inverts the high voltage DC from high voltage supply 104 to AC that is output to motor 118. The inverter includes power switching semiconductors that controlled by one or more control logic devices (not shown) of low voltage section 206.

Electrical power system 201 includes a POF transmit module POFTx module 210 that is coupled to a POF receive module POFRx module 212 by a power over fiber cable 214 having one or more optical fibers 215 (representatively shown by optical fiber 214 in FIG. 2) that carry light transmitted by POFTx module 210 to POFRx module 212. POFTx module 210 is electrically connected to low voltage supply 106 by electrical conductors such as copper wire that electrically connect the low voltage supply 106 to POFTx module 210. Electrical conductors also electrically connect EMCU 220 to low voltage supply 106. EMCU 220 is coupled in data communication with low voltage section 206 by an optical fiber data bus cable 216 that includes one or more optical fibers 218 (representatively shown by the two optical fibers 218 in FIG. 2) that carry optical data signals transmitted by an optical data module 222 of EMCU 220 to an optical data module 224 of low voltage section 206 and optical data signals transmitted by optical data module 224 of low voltage section 206 to optical data module 226 of EMCU 220.

It should be understood that high voltage module 202 is electrically isolated from any low voltage portions of vehicle 200 by the use of optical fiber to provide the low voltage power to high voltage module and for data communication between high voltage module 202 and any other device of vehicle 200 that is powered by low voltage, such as EMCU 220. This eliminates the need for isolation barriers such as isolation barrier 116 having isolation devices such as isolated DC/DC converters. Since there is now no electrical contact between the high voltage module and any other device in the vehicle that is powered by low voltage, there is no need to have two independent voltage supplies and two independent grounds to provide the high and low voltage power to the high voltage module 202. In high voltage module 202, the high and low voltage power have one common ground, simplifying the power topology of high voltage module 202.

POFTx module 210 includes one more power laser diodes 228 (only one of which is shown in FIG. 2) and POFRx module 212 includes corresponding photovoltaic converters 229 (only one of which is shown in FIG. 2) that convert light transmitted by power laser diodes 228 to electrical power. In an aspect, PFOTx module 210 and POFRx module 212 are also logically coupled to each other by optical fibers 230 that carry data signals between them. Optical fibers 230 are illustratively included in power over fiber cable 214.

In an aspect, high voltage supply 104 is connected to HV Section 208 by +HVDC electrical cable 232 and −HVDC electrical cable 234, which are each insulated high voltage electrical cables. In an aspect, +HVDC electrical cable 232 and −HVDC electrical cable 234 are included in a cable 236 that also includes power over fiber cable 214 and optical fiber data bus cable 216.

Figure 3:
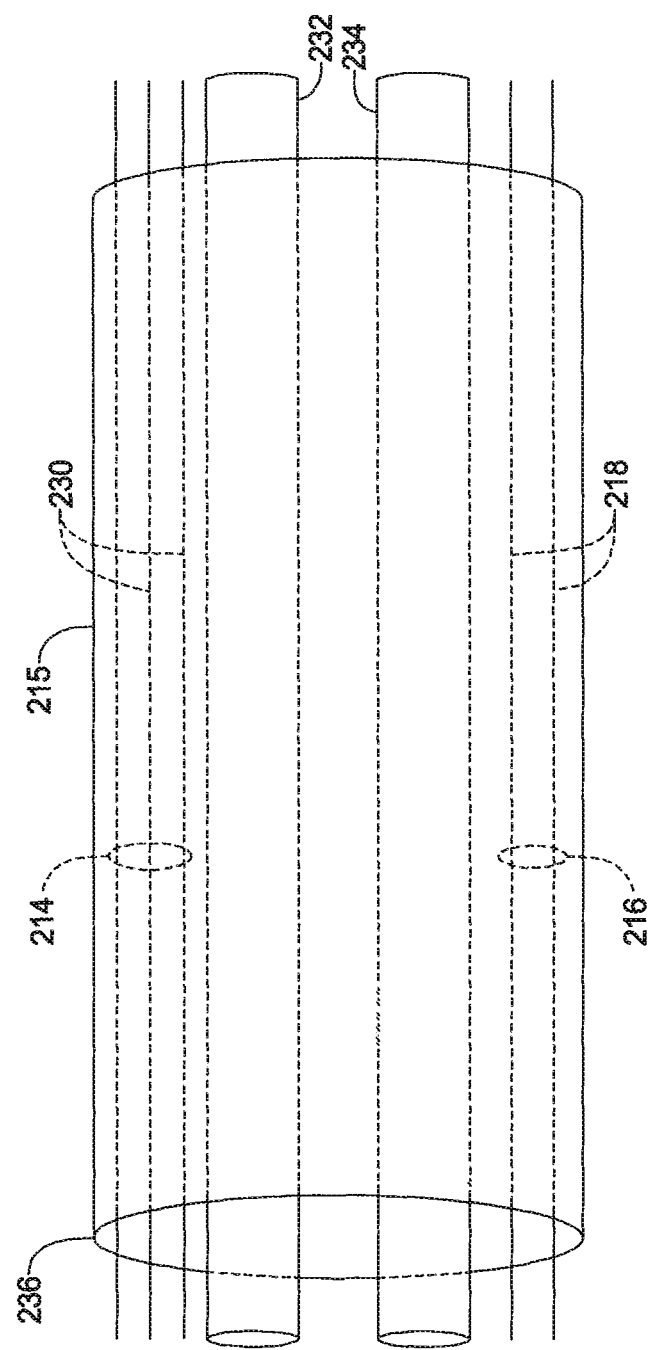
FIG. 3 is a simplified diagram of a cable of the power system of FIG. 2.

FIG. 3 is a simplified diagram of cable 236. The +HVDC electrical cable 232 and −HVDC electrical cable 234 are disposed in a center of cable 236 and surrounded by the optical fibers 215, 230 of power over fiber cable 214 and optical fibers 218 of optical fiber data bus cable 216. In addition to carrying light (for power and data as applicable), the optical fibers 215, 218, 230 provide additional insulation for +HVDC electrical cable 232 and −HVDC electrical cable 234.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle having an electric traction motor, comprising:
a high voltage module having a low voltage section and a high voltage section, the high voltage section electrically connected to the electric traction motor and providing electric power to the electric traction motor, the high voltage section also electrically connected to a high voltage direct current supply;
the low voltage section and the high voltage section having a common ground and the low voltage section and the high voltage section are not electrically isolated from each other by an isolation barrier between the low voltage section and the high voltage section;
the low voltage section including a power over fiber receive module and a first optical data module;
a low voltage direct current supply electrically connected to a power over fiber transmit module, the power over fiber transmit module optically coupled by a power over fiber cable to the power over fiber receive module of the low voltage section of the high voltage module; and an electronic motor control unit powered by the low voltage direct current supply and electrically connected to the low voltage direct current supply, the electronic motor control unit including a second optical data module, the second optical data module of the electronic motor control unit optically coupled by an optical fiber data bus cable to the first optical data module of the low voltage section of the high voltage module.

2. The vehicle of claim 1 wherein the high voltage module is interconnected with any low voltage section of the vehicle only by optical fibers.

3. The vehicle of claim 1 including positive and negative high voltage cables electrically connecting the high voltage section of the high voltage module to the high voltage direct current supply and a cable that includes the positive and negative high voltage cables, the power over fiber cable and the optical fiber data bus cable with optical fibers of the power over fiber cable and the optical fiber data bus cable surrounding the positive and negative high voltage cables.

\* \* \* \* \*